US011868110B2

(12) United States Patent
Lee et al.

(10) Patent No.: US 11,868,110 B2
(45) Date of Patent: Jan. 9, 2024

(54) SERVICE OPERATION METHOD FOR ENERGY MANAGEMENT FOR EACH TENANT IN MULTI-TENANT ENVIRONMENT, AND ENERGY MANAGEMENT SERVICE SUPPLY SYSTEM

(71) Applicant: Electronics and Telecommunications Research Institute, Daejeon (KR)

(72) Inventors: Jihyun Lee, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/545,448

(22) Filed: Dec. 8, 2021

(65) Prior Publication Data
US 2022/0179380 A1 Jun. 9, 2022

(30) Foreign Application Priority Data

Dec. 8, 2020 (KR) .................. 10-2020-0170673
Oct. 28, 2021 (KR) .................. 10-2021-0145668

(51) Int. Cl.
G06Q 50/06 (2012.01)
G05B 19/042 (2006.01)

(52) U.S. Cl.
CPC .......... *G05B 19/042* (2013.01); *G06Q 50/06* (2013.01); *G05B 2219/2639* (2013.01)

(58) Field of Classification Search
CPC .......... G05B 19/042; G05B 2219/2639; G05B 2219/2642; G05B 15/02; G06Q 50/06; Y02P 80/10
See application file for complete search history.

(56) References Cited

U.S. PATENT DOCUMENTS

2012/0150454 A1   6/2012 Lee et al.
2013/0274940 A1*  10/2013 Wei .................. G06Q 50/06
                                                    700/291

(Continued)

FOREIGN PATENT DOCUMENTS

KR   10-2015-0043170         4/2015
KR   10-2020-0131375        11/2020
KR      20200131375 A   *  11/2020  ......... G06F 9/45558

OTHER PUBLICATIONS

Hwang et al: "The Development of a Web-based Realtime Monitoring System for Facility Energy Uses in Forging Processes," Journal of Internet Computing and Services, Feb. 28, 2018, pp. 87-95.

(Continued)

*Primary Examiner* — Tarun Sinha
*Assistant Examiner* — James I Burris
(74) *Attorney, Agent, or Firm* — KILE PARK REED & HOUTTEMAN PLLC

(57) ABSTRACT

Disclosed is a service operation method for managing energy data for each tenant. More particularly, the service operation method monitors energy consumption consumed in a specific space that a tenant manager desires to manage using an individualized energy management service user interface (UI) according to a service development/production environment set by a manager terminal and visualizes a status of use of energy for each specific space from a monitoring result.

19 Claims, 11 Drawing Sheets

(56) References Cited

U.S. PATENT DOCUMENTS

2014/0188571 A1 7/2014 Han et al.
2017/0054759 A1 2/2017 Lee et al.
2017/0279697 A1 9/2017 Katsaros et al.

OTHER PUBLICATIONS

Sungwon Ahn: "Changes in Cloud Virtualization Technology—Container-based cloud virtualization and DevOps," Software Policy & Research Institute (SPRI), Dec. 10, 2018.

* cited by examiner

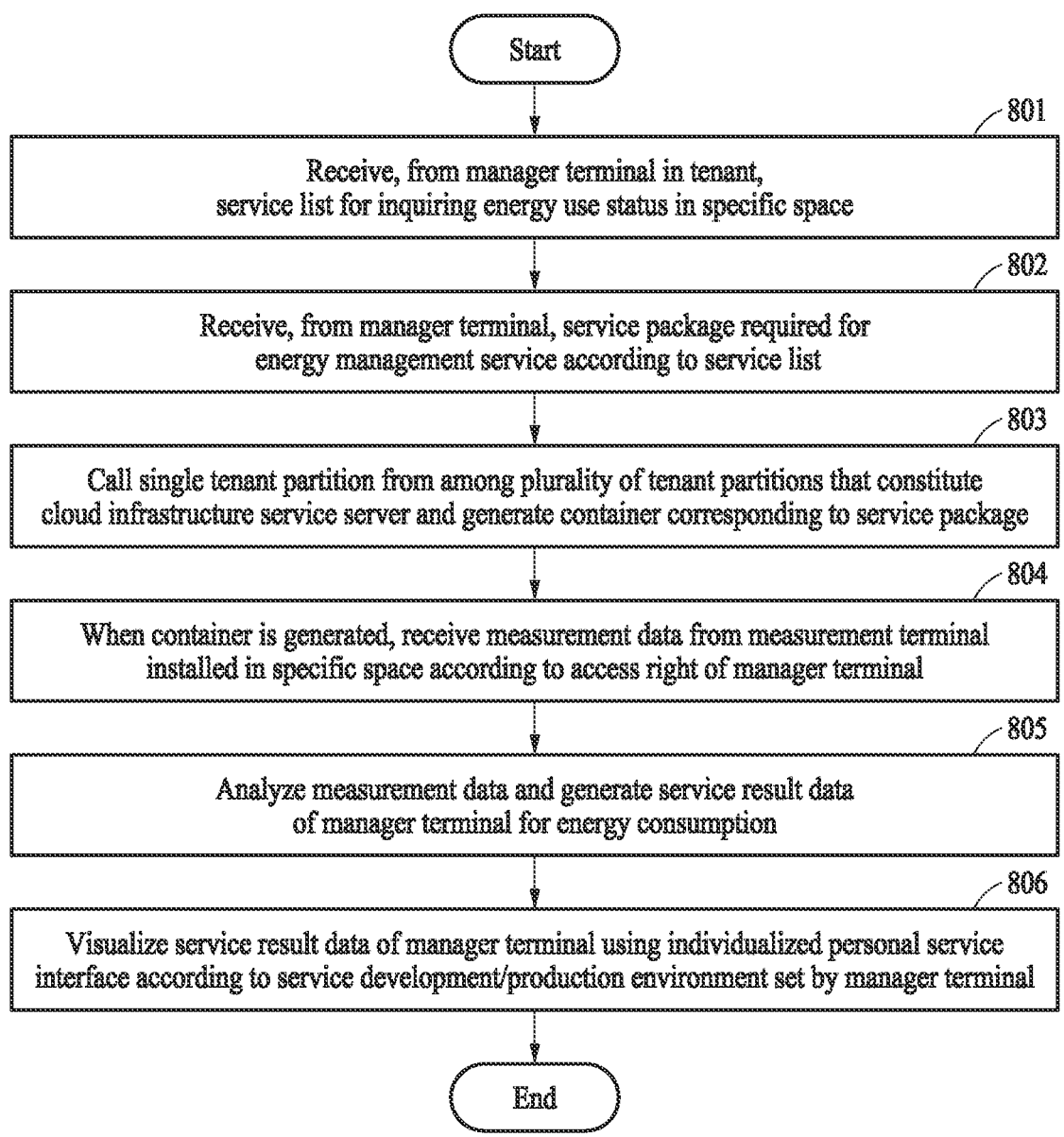

SERVICE OPERATION METHOD FOR ENERGY MANAGEMENT FOR EACH TENANT IN MULTI-TENANT ENVIRONMENT, AND ENERGY MANAGEMENT SERVICE SUPPLY SYSTEM

CROSS-REFERENCE TO RELATED APPLICATION(S)

This application claims the benefit of Korean Patent Application No. 10-2020-0170673 filed on Dec. 8, 2020, and Korean Patent Application No. 10-2021-0145668 filed on Oct. 28, 2021, in the Korean Intellectual Property Office, the entire disclosures of which are incorporated herein by reference for all purposes.

BACKGROUND

1. Field of the Invention

One or more example embodiments relate to a service operation method and an energy management service supply system, and more particularly, to a system and method for monitoring and managing energy data consumed in a specific space in real time through an energy management service of a container provided for each tenant in a multi-tenant environment.

2. Description of the Related Art

In general, an energy management system installed in a factory may measure energy use amount used in a facility installed in the factory and collects measurement data through a plurality of servers. The energy management system performs monitoring and analyzes whether energy distribution is smoothly ongoing according to an operating state of the facility. However, energy track data analysis and management technology for a manufacturing factory is in an initial stage to apply technology to industrial sites, and a domestic market for this has not yet been formed.

Also, since a large number of manpower and a large amount of time are required to manage a large number of servers installed in a factory, various automated operation supportive systems are developed. In a cloud platform, a plurality of tenants simultaneously uses a single instance service through a shared platform. Therefore, a single tenant's own independence among individual tenants need to be ensured and a plurality of servers needs to be simultaneously managed. However, development of an automated server operation supportive system that satisfies all of them remains very insufficient.

SUMMARY

Example embodiments provide a service operation method that ensures privacy for storing and retrieving energy data for each factory while supplying a service operating in a cloud computing environment available in a plurality of factories in an independent form for each factory.

Example embodiments also provide a service operation method that may visualize a status of use of energy for each factory and may economically introduce and use an energy management service by applying a multitenant supportive system architecture to ensure privacy for each factory.

According to an aspect of this invention, there is a service operation method performed by a cloud infrastructure service server as follows: the service operation method including receiving a service production request for inquiring energy data consumed in a specific space from a manager terminal in a tenant; in response to receiving the service production request, receiving measured data from a measurement device installed in the specific space according to an access right of the manager terminal; analyzing the measured data based on a service composition list according to the service production request and generating service result data to the manager terminal; and visualizing the service result data to the manager terminal using an individualized personal service interface according to a service development/production environment set by the manager terminal.

The receiving of the measurement data may include determining the access right of the manager terminal at a point in time at which the service production request is received, using a unique identifier for each tenant; and receiving the measurement data for energy consumption from the measurement device installed in the specific space desired to be managed through the manager terminal according to the access right.

The generating of the service result data to the manager terminal may include adjusting a unit of the measurement data to correspond to a data structure according to a transmission protocol; and generating the service result data by performing a preprocessing process of combining or separating the measurement data according to order of the measurement data with the adjusted unit.

The generating of the service result data to the manager terminal may include identifying a functional operation of an energy management service that runs in the tenant based on the service composition list according to the service production request; and analyzing the measurement data through an execution function used for the functional operation of the energy management service and generating the service result data for energy consumption in the specific space.

The generating of the service result data to the manager terminal may include applying an analysis function to the measurement data and analyzing whether energy distribution is smoothly ongoing according to an operating state of a facility that constitutes the specific space; and generating the service result data in the form of a chart, in which the energy consumption is subdivided according to the analysis result.

The generating of the service result data to the manager terminal may include generating a service using at least one of a virtual Internet protocol (IP), a port number, a specific path, and a path access right at a point in time at which a functional operation of the energy management service runs.

The visualizing of the service result data to the manager terminal may include selecting a service image to be used by the manager terminal in the service development/production environment and forming a customized personal service interface to correspond to the service production request; and visualizing the service result data to be accessible through the customized personal service interface.

The visualizing of the service result data to the manager terminal may include visualizing the service result data in an independent form according to a tenant based on reference information of a facility that constitutes the specific space.

According to another aspect of the this invention, there is a service operation method performed by a cloud infrastructure service server as follows: the service operation method including receiving, from a manager terminal of a tenant, a request for container generation task for packaging a service produced to manage energy data consumed in a specific space; calling a single tenant partition prepared for building the specific tenant's service package from the plurality of tenant partitions according to the request and then generating a container to the manager terminal; when the container is generated, collecting measured data from a measuring device installed in the specific space that the manager terminal in the tenant desires to manage; and analyzing the measured data and visualizing service result data related to energy consumption consumed in the specific space.

The receiving of the request for the container generation task may include receiving a service production request required for inquiring an energy use status of the specific space to be managed through the requested tenant's manager terminal; in response to receiving the service production request, determining an access right to the manager terminal in the requested tenant using the unique identifier assigned for each tenant; and receiving the request for the container generation task for packaging the service from the manager terminal when the access right is verified.

The generating of the container may include calling a single tenant partition using an identifier of the manager terminal and an index of the tenant partition included in the cloud infrastructure service server; and generating the container for building an individualized service package from a service development/production environment set by the manager terminal in the called single tenant partition.

The visualizing of the service result data may include adjusting a unit of the measured data collected from the measurement device and order of the measured data to correspond to a data structure according to a transmission protocol; generating the service result data in the form of a chart, for the energy consumption in the specific space by performing a preprocessing process of combining or separating the measured data with the adjusted data structure; and visualizing the service result data to a service development/production environment set by the manager terminal.

The visualizing of the service result data may include identifying a functional operation of an energy management service that runs in the tenant based on the service composition list according to the service production request; and analyzing the measured data through an execution function used for the functional operation of the energy management service and visualizing the service result data.

The visualizing of the service result data may include applying the execution function to the measured data and visualizing the subdivided service result data regarding whether energy distribution is smoothly ongoing according to an operating state of a facility that constitutes the specific space.

The visualizing of the service result data may include forming a personal service interface corresponding to the service production request using a service image to be used in the service development/production environment set by the manager terminal; and visualizing the service result data to be accessible through the personal service interface.

The visualizing may include visualizing the service result data in an independent form according to a tenant based on reference information of a facility that constitutes the specific space.

According to still another aspect of this invention, there is provided a service operation method performed by a cloud infrastructure service server, the service operation method including receiving, from a manager terminal in a tenant, a service composition list for inquiring an energy use status in a specific space; receiving, from the manager terminal, a service package required for an energy management service according to the service composition list; calling a single tenant partition from among a plurality of tenant partitions that constitute the cloud infrastructure service server and generating a container corresponding to the service package; when the container is generated, receiving measured data from a measurement device installed in the specific space according to an access right of the manager terminal; analyzing the measured data and generating service result data to the manager terminal for energy consumption; and visualizing the service result data to the manager terminal using an individualized personal service interface according to a service development/production environment set by the manager terminal.

The generating of the service result data to the manager terminal may include adjusting a unit of the measured data collected from the measurement device and order of the measured data to correspond to a data structure according to a transmission protocol; and generating the service result data in the form of a chart, for the energy consumption in the specific space by performing a preprocessing process of combining or separating the measured data with the adjusted data structure.

The generating of the service result data to the manager terminal may include applying an analysis function to the measured data and analyzing whether energy distribution is smoothly ongoing according to an operating state of facility that constitutes the specific space; and generating the service result data in the form of a chart, in which the energy consumption is subdivided according to the analysis result.

The visualizing of the service result data may include forming a personal service interface corresponding to the service production request using a service image to be used in the service development/production environment set by the manager terminal; and visualizing the service result data to be accessible through the personal service interface.

Additional aspects of example embodiments will be set forth in part in the description which follows and, in part, will be apparent from the description, or may be learned by practice of the disclosure.

According to example embodiments, a service operation method may ensure privacy for storing and retrieving energy data for each factory while supplying a service operating in a cloud computing environment available in a plurality of factories in an independent form for each factory.

According to example embodiments, a service operation method may visualize a status of use of energy for each factory and may economically introduce and use an energy management service by applying a system architecture to ensure privacy for each factory.

According to example embodiments, a service operation method may provide an effect that may be used more readily in terms of availability, safety, and cost management by operating an optimal data sensor using a multi-tenant.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 is a flowchart illustrating a service operation method according to still another example embodiment.

DETAILED DESCRIPTION

Figure 1:
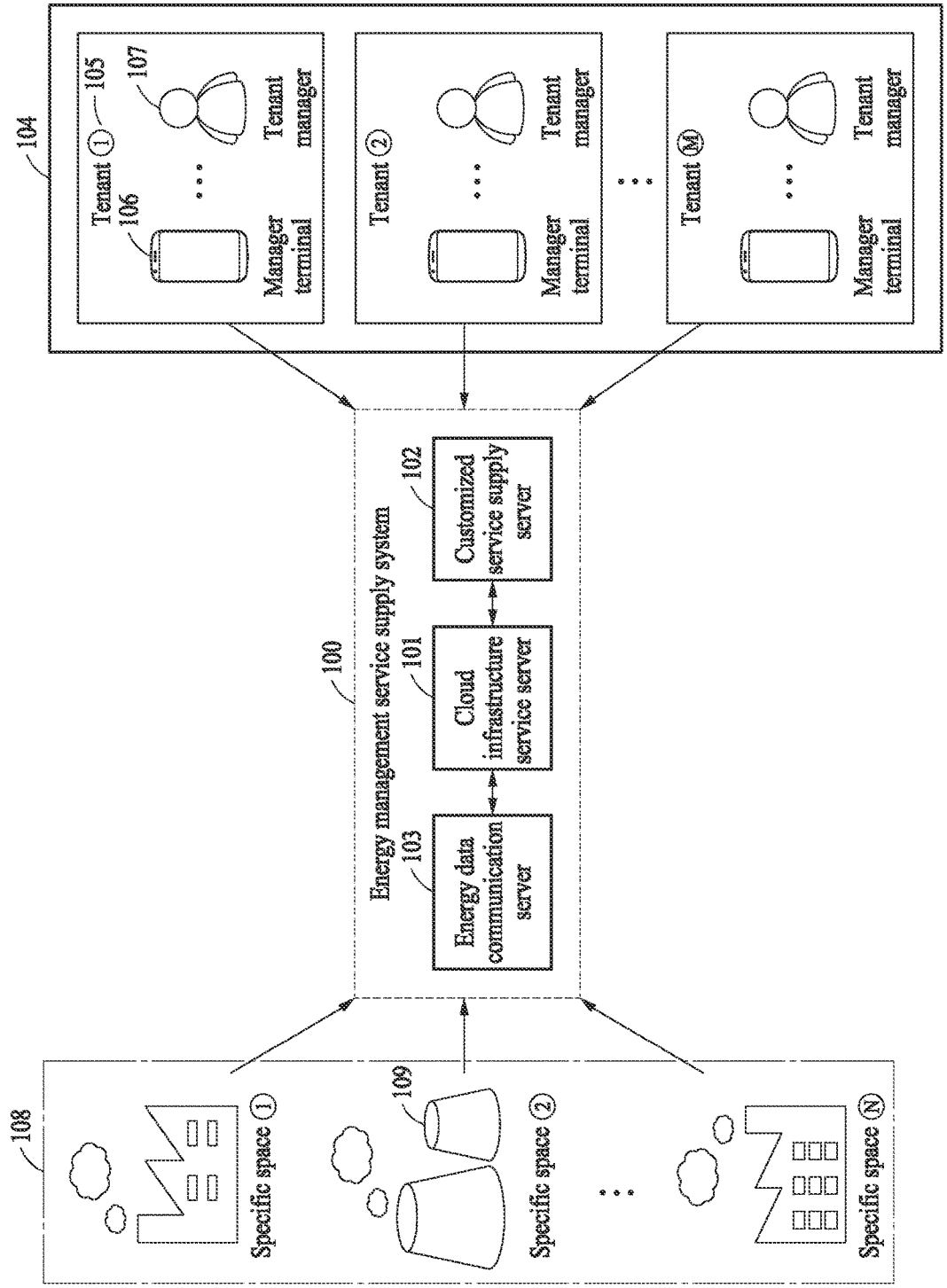
FIG. 1 illustrates an example of a multi-tenant-based energy management service supply system according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

Hereinafter, example embodiments are described with reference to the accompanying drawings.

FIG. 1 illustrates an example of a multi-tenant-based energy management service supply system according to an example embodiment.

Referring to FIG. 1, an energy management service supply system 100 may provide a hardware infrastructure service and a software service on a cloud capable of using a necessary service required to manage energy consumed in a facility provided in a specific space through access online. The energy management service supply system 100 may include a cloud infrastructure service server 101, a customized service supply server 102, and an energy data communication server 103.

The cloud infrastructure service server 101 may be a cloud server configured to support an individualized container for each tenant to ensure independence of a multi-tenant 104. The cloud infrastructure service server 101 may set a role and an access right for each corresponding manager terminal belonging to each tenant. In response to a request from a corresponding tenant manager belonging to each tenant, the cloud infrastructure service server 101 may differently set a service development/production environment of an application or a webpage for each tenant. Here, a tenant 105 refers to the single user group that includes a single manager terminal 106 and a plurality of user terminals (not shown) and may refer to a group that includes, for example, a company, an institution, and an organization.

The manager terminal 106 may set and manage a use environment of a personal service interface displayed for users that belong to the tenant 105. That is, the manager terminal 106 may individualize the personal service interface for the tenant 105 to fit the use environment of the personal service interface according to a specific space that a tenant manager 107 desires to manage.

The cloud infrastructure service server 101 may analyze and manage energy data collected from each of specific spaces 108 through interaction with the customized service supply server 102 and the energy data communication server 103. Each of the specific spaces 108 may refer to a site location such as in which a factory or a manufacturing industry that interacts with each corresponding tenant. The cloud infrastructure service server 101 may generate a container corresponding to a personalized service package for each tenant through interaction with the customized service supply server 102. The cloud infrastructure service server 101 may perform a runtime engine for detailed services included in the container corresponding to a request from a tenant manager or a preset monitoring period.

In detail, the cloud infrastructure service server 101 may receive a request for a container generation task for the produced service package to manage energy data consumed in a specific space 109 from the manager terminal 106 of the tenant 105 through the customized service supply server 102.

The cloud infrastructure service server 101 may call a single tenant partition prepared for building the specific tenant's service package from the plurality of tenant partition according to the request and then may generate a container of the manager terminal 106. That is, the cloud infrastructure service server 101 may generate the container to the manager terminal 106 by receiving a service composition list for inquiring an energy use status in the specific space 109 from the manager terminal 106 in the tenant 105 and by receiving a service package required for an energy management service according to the service composition list.

The cloud infrastructure service server 101 may receive a service production request for inquiring energy data consumed in the specific space 109. In response to receiving the service production request, the cloud infrastructure service server 101 may receive measured data from a measurement device (not shown) installed in the specific space 109 according to an access right of the manager terminal 106. Here, the cloud infrastructure service server 101 may determine the access right to the manager terminal 106 at a point in time at which the service production request is received, using a unique identifier assigned for each tenant. The cloud infrastructure service server 101 may receive the measured data for energy consumption from the measurement device installed in the specific space 109 desired to be managed through the manager terminal 106 according to the access right.

The cloud infrastructure service server 101 may receive the measured data for the energy consumption from the measurement device installed in the specific space 109 through interaction with the energy data communication server 103. A detailed configuration is further described with reference to FIGS. 5A to 5D.

① Measurement Data on Which a Preprocessing Process is Performed:

The energy data communication server 103 may perform a preprocessing process on, that is, preprocess measured data received from the measurement device installed in the specific space 109 and then may transmit the preprocessed measured data to the cloud infrastructure service server 101. The energy data communication server 103 may perform the preprocessing process on the measured data received from the measurement device installed in the specific space 109 through a measured data communication module and a measured data preprocessing module.

② Measurement Data on Which a Preprocessing Process is Not Performed:

The energy data communication server 103 may transmit measured data on which the preprocessing process is not performed, that is, unprocessed measured data to the cloud infrastructure service server 101. The measured data transmitted from the energy data communication server 103 may include a unique number of data, date information, a measuring instrument number, and tag information in which a single measurement value is mapped to a single tag. It may be represented as graph (a) of FIG. 5B. In response to receiving the unprocessed measured data, the cloud infrastructure service server 101 may adjust a unit of the measured data to correspond to a data structure according to a transmission protocol. The cloud infrastructure service server 101 may perform the preprocessing process of combining or separating the measured data according to order of the measured data with the adjusted unit. For example, order of the measured data may be listed by a unique number of data, date information, etc. A form of data preprocessed by combining or separating the measured data may be represented as graph (b) and graph (c) of FIG. 5B.

The cloud infrastructure service server 101 may analyze the measured data based on the service composition list according to the service production request and may generate service result data to a corresponding manager terminal, for example, the manager terminal 106. In detail, the cloud infrastructure service server 101 may identify a functional operation of an energy management service that runs in a corresponding tenant based on the service composition list corresponding to the service production request. The cloud infrastructure service server 101 may analyze whether energy distribution is smoothly ongoing according to an operating state of a process facility that constitutes a specific space through an execution function used for the functional operation. It may be represented as shown in a structure of FIG. 5C. Also, the example embodiment may analyze whether the energy distribution is smoothly ongoing in terms of data and may perform the same through a series of process as illustrated in a flowchart of FIG. 5D.

The cloud infrastructure service server 101 may generate service result data in which energy consumption is subdivided based on an analysis result. Also, the example embodiment provides a service providing environment for dividing the energy consumption in detail and visualizing analysis result data.

The cloud infrastructure service server 101 may form a personal service interface corresponding to the service production request using a service image to be used in a service development/production environment set by the manager terminal. The cloud infrastructure service server 101 may visualize a service result to be accessible through the personal service interface.

Accordingly, the example embodiment may perform monitoring and management to improve use efficiency of energy data by visualizing a use status related to energy in a specific space and by analyzing an energy data element being wasted and nonuniform distribution of energy data.

Figure 2:
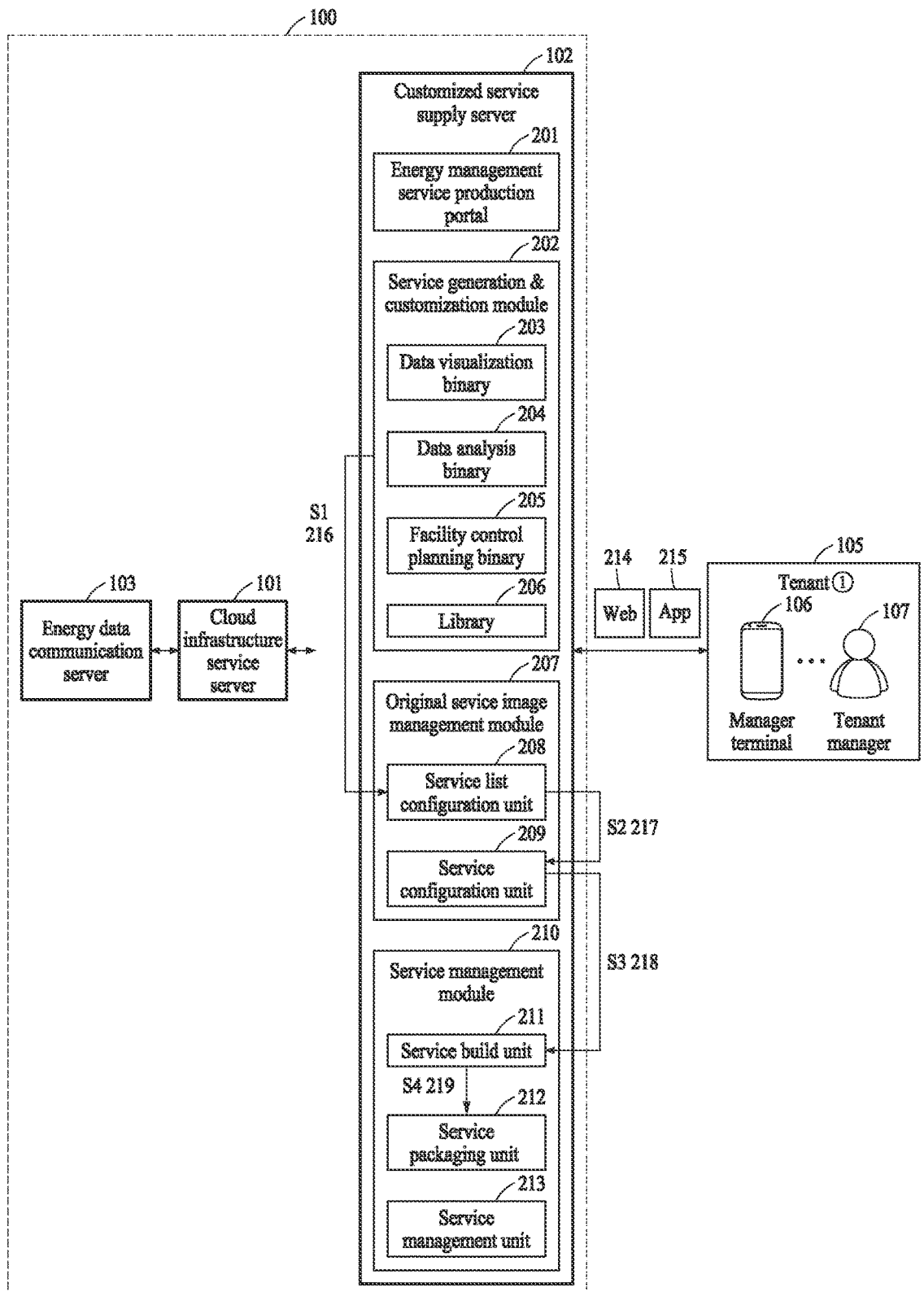
FIG. 2 illustrates an example of describing an operation of a customized service supply server used for configuring a user interface (UI) for service customization for each tenant according to an example embodiment.

FIG. 2 illustrates an example of describing an operation of a customized service supply server for configuring a service configuration user interface (UI) for each tenant according to an example embodiment.

Referring to FIG. 2, the customized service supply server 102 may provide a function for producing an energy management service that manages a specific space. The customized service supply server 102 may identify a tenant manager 107 that accesses to produce an energy management service for each tenant and may generate an energy management service for the tenant manager 107 to directly manage energy consumed in a specific space. The customized service supply server 102 may provide a service authoring tool related to a service production and provision function that may be generated as the energy management service.

Therefore, the customized service supply server 102 may include an energy management service production portal 201, a service generation and customization module 202, an original service image management module 207, and a service management module 210.

In detail, the energy management service production portal 201 may be a gate for approaching the customized service supply server 102. That is, the energy management service production portal 201 may perform the functionality of the gate for authenticating a manager terminal that accesses to generate the energy management service operating in a cloud computing environment.

Also, the energy management service production portal 201 may perform the functionality of the gate for approaching the cloud infrastructure service server 101 configured to manage the energy management service generated through the customized service supply server 102. For example, the manager terminal 106 belonging to at least one tenant, for example, the tenant 105, among a plurality of tenants may be connected to the energy management service production portal 201. When the manager terminal 106 is connected, the manager terminal 106 may request a login to the customized service supply server 102 using an ID and a password assigned to the tenant manager 107. The energy management service production portal 201 may perform an access process to the customized service supply server 102 through the ID and the password requested for login. For example, the manager terminal 106 may access the energy management service production portal 201 through a web page 214 or an application 215.

The energy management service production portal 201 may allow access of the manager terminal 106 according to the access process and may allow the same or different access right to the manager terminal 106 that belongs to the tenant 105, that is, each manager terminal for each tenant. The access right refers to a type accessible to detailed services for generating and supplying a necessary energy management service for each specific space that the manager terminal 106 desires to manage. Therefore, the manager terminal 106 may generate an energy management service to ensure privacy for storage and access of energy data according to the access right assigned to the tenant 105 to which the manager terminal 106 belongs.

The example embodiment may generate the energy management service desired by the tenant manager 107 using each module after the manager terminal 106 accesses the customized service supply server 102 through the energy management service production portal 201.

(1) Service Generation and Customization Module

The service generation and customization module 202 may store an original file of a service configuration UI, a service control library, and a service binary to generate an energy management service. The original file may be a component that is essentially required to manage energy in a specific space that the tenant manager 107 desires to manage. For example, the service generation and customization module 202 may include a data visualization binary 203, a data analysis binary 204, a facility control planning binary 205, and a library 206 as components.

Here, the customized service supply server 102 may provide the same interface to a plurality of tenants connected to the energy management service production portal 201. The service generation and customization module 202 may store an original file about an interface provided from the customized service supply server 102 to correspond to the manager terminal 106. In response to calling a constituent component that constitutes a software service required for a runtime operation from the cloud infrastructure service server 101, the service generation and customization module 202 may perform the functionality related to withdrawal, update, and deletion from the prestored original file.

(2) Original Service Image Management Module

The original service image management module 207 may generate an energy management service that operates in a cloud computing environment to be used to manage energy consumed in a specific space. The original service image management module 207 may extract, from the service generation and customization module 202, a constituent component required to generate the energy management service. The original service image management module 207 may select at least one of the service binary, the service control library, and the service configuration UI from the service generation and customization module 202. The original service image management module 207 may perform a preparation process required for a service build by setting a position, a dynamic coupling, and a dynamic connection level of each selected constituent component required for I/O operation. The original service image management module 207 may include a service composition list configuration unit 208 and a service configuration unit 209.

① The service composition list configuration unit 208 may perform the functionality of configuring physical objects of the service generation and customization module 202 as a service composition list.

② The service configuration unit 209 may perform the functionality of selecting constituent components required for a service configuration from the service composition list generated by the service composition list configuration unit 208 and setting connection information between the selected constituent components.

(3) Service Management Module

The service management module 210 may perform the functionality of receiving a generated service configuration result from the service configuration unit 209 and to manage a compile, a packaging, and a modification from the received service configuration result. To this end, the service management module 210 may include a service build unit 211, a service packaging unit 212, and a service management unit 213.

① The service build unit 211 may generate a library for the energy management service by compiling the energy management service, and by linking the library 206 of the service generation and customization module 202.

② The service packaging unit 212 may package the energy management service and may provide the packaged energy management service in the cloud computing environment.

③ The service management unit 213 may store modifications about constituent components of the energy management service that runs in the cloud infrastructure service server 101 and may track a storage history of the modification.

Accordingly, the customized service supply server 102 may perform a series of the following process to generate the energy management service.

In operation S1 216, the customized service supply server 102 may receive a request for accessing the energy management service production portal 201 from the manager terminal 106.

In operation S2 217, the customized service supply server 102 may constitute a service composition list for generating the energy management service in response to an instruction from the manager terminal 106 allowed to access.

In operation S3 218, the customized service supply server 102 may select constituent components required for the energy management service from the service composition list and may set connection information between the selected constituent components.

Figure 3:
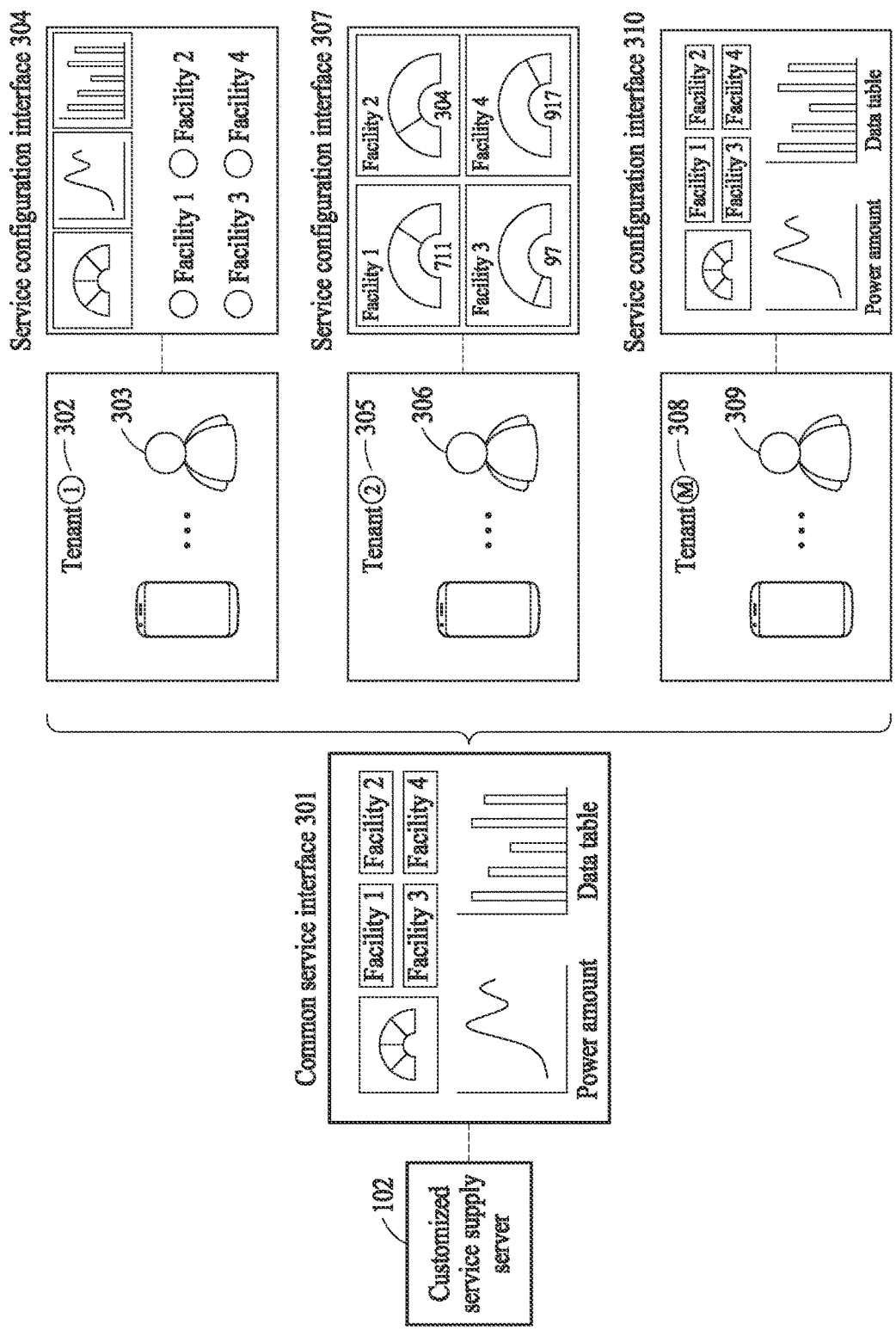
FIG. 3 illustrates an example of an individualized service UI customized from a service development/production environment set by a manager terminal according to an example embodiment.

FIG. 3 illustrates an example of an individualized personal service interface based on a service development/production environment set by a manager terminal according to an example embodiment.

Referring to FIG. 3, the customized service supply server 102 may provide a common service interface 301 to each of tenants 302, 305, and 308. The customized service supply server 102 may provide the common service interface 301 that is commonly used by a plurality of users as a service development production environment settable by a manager terminal. The common service interface 301 may be a physical medium that may interact through an OS resource capable of executing a program in a common environment.

Tenant managers 303, 306, and 309 of the tenants 302, 305, and 308 may set individualized service configuration interfaces 304, 307, and 310, respectively, according to the service development/production environment based on the common service interface 301 that is commonly produced by the customized service supply server 102.

Here, the service configuration interfaces 304, 307, and 310 may be in a UI structure (304) different from a UI structure of the common service interface 301, a UI structure (307) different from the UI structure of the common service interface 301, or a UI structure (310) identical to the UI structure of the common service interface 301 according to according to the service development/production environment set by the manager terminal.

Figure 4:
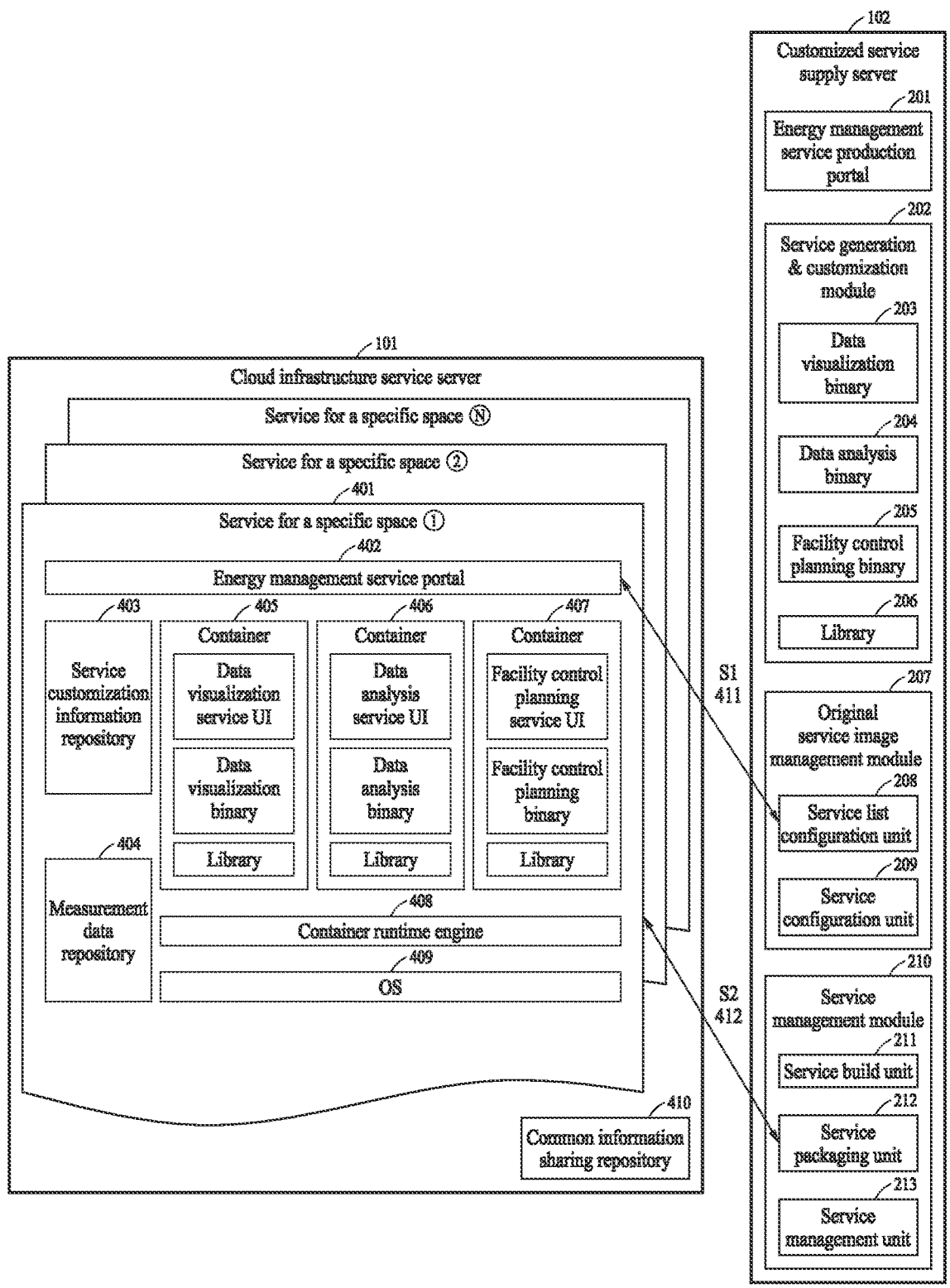
FIG. 4 illustrates an example of describing an operation of a cloud infrastructure service server for providing multi-tenants with each tenant's customized service according to an example embodiment.

FIG. 4 illustrates an example of describing an operation of a cloud infrastructure service server based on a multi-tenant according to an example embodiment.

Referring to FIG. 4, the cloud infrastructure service server 101 may provide an energy management service for a service package produced by the customized service supply server 102 to a specific space through interaction with the customized service supply server 102. When providing the energy management service to the specific space, the cloud infrastructure service server 101 may divide the specific space into a hardware infrastructure service and a software service. The cloud infrastructure service server 101 may include at least one tenant partition defined to be used for a runtime based on a multi-tenant environment.

Each tenant partition may be associated with a globally unique partition identifier (ID) and a partition configuration. The cloud infrastructure service server 101 may divide a tenant partition into a secure area and a general area according to a level of the tenant partition and may generate a service package produced by the customized service supply server 102 in a container form in the tenant partition. The service package may refer to a single execution package of detailed services used in the specific space. Here, the service package executable as detailed services may be configured as a container in the cloud infrastructure service server 101. The cloud infrastructure service server 101 may divide the service development/production environment set by a manager terminal into a personalized tenant partition for each tenant and thereby manage. For example, the cloud infrastructure service server 101 may individualize and thereby manage a service for a specific space ① 401 for managing energy consumed in the specific space for each multi-tenant. In operation S1 411, the cloud infrastructure service server 101 may receive a service composition list configured to generate an energy management service from a service composition list configuration unit 208 of the customized service supply server 102 in response to a service production request of a manager terminal.

The cloud infrastructure service server 101 may receive reference information required for a service customization input from a tenant manager to the service generation and customization module 202 of the customized service supply server 102 through an energy management service portal 402. The reference information required for the service customization may include a type of a factory energy facility, facility deployment information, facility capacity, efficiency, I/O power/voltage/power consumption, product production scheduling of facility, a product production amount per time unit, and an energy standard amount required for product production.

Also, the cloud infrastructure service server 101 may transmit an alarm about reference information required for an inconsistent service customization from the service generation customization module 202 to the service generation customization module 202 through the energy management service portal 402, such that the tenant manager may correct the inconsistent reference information. The cloud infrastructure service server 101 may set and generate the energy management service based on the received reference information.

The cloud infrastructure service server 101 may receive the service composition list through the energy management service portal 402. The energy management service portal 402 may provide a gate for the tenant manager to access the Internet and to provide a cloud service provided through the connected Internet. That is, the energy management service portal 402 may be a gate for accessing the cloud service. The cloud service may be a service capable of using an Internet-based computing resource, for example, a central processing unit (CPU), a memory, and a disk, and a service capable of using Internet-based software.

In operation S2 412, the cloud infrastructure service server 101 may receive the service package from a service packaging unit of the customized service supply server 102. In detail, the cloud infrastructure service server 101 may perform a service supply operation between a service management module of the customized service supply server 102 and the cloud infrastructure service server 101. The service packaging unit of the customized service supply server 102 may package the energy management service and may provide the energy management service to the cloud infrastructure service server 101 of the cloud computing environment.

The cloud infrastructure service server 101 may call a single tenant partition for building the service package from among a plurality of tenant partitions and may generate containers 405, 406, and 407 at the backend side of the manager terminal.

Each container 405, 406, 407 at the backend side of the manager terminal may perform a different operation. In detail, the service package may include a different service function based on a characteristic of a specific space that the tenant manager desires to manage. That is, a type of energy data consumed may differ depending on whether the specific space is a factory or a building, and although the specific space is a factory, a type of energy data consumed may differ for each factory.

Therefore, a type of energy data to be monitored may differ depending on the purpose of the specific space that the tenant manager desires to manage, which may be produced as a differentiated energy management service for each specific space and tenant manager.

The cloud infrastructure service server 101 may generate a plurality of containers 405, 406, and 407 about different functions corresponding to the service package for each tenant. Therefore, the cloud infrastructure service server 101 may employ a different form of visualizing measured data measured for each specific space, a different algorithm for analyzing measured data, and a different control mechanism for controlling a facility arranged in each specific space.

Detailed services required for each specific space may include a service binary, a service UI, and a library. The service binary may provide a function developed in software, the service UI may provide a function of expressing a user interface, and the library may be a bundle of execution functions required for a service operation. The cloud infrastructure service server 101 may generate each of the container 405 related to data visualization based on detailed services, the container 406 related to data analysis, and the container 407 related to facility control planning in the service for the specific space ① 401.

The cloud infrastructure service server 101 may include a service customization information repository 403, a measurement data repository 404, a container runtime engine 408, an OS 409, and a common information sharing repository 410.

① The container runtime engine 408 may be an engine in which low level routines executable in runtime are stored such that libraries and "service binary" services in the containers 405, 406, and 407 may perform a functional operation in a runtime environment. The container runtime engine 408 may provide a software environment that operates in runtime.

② The OS 409 is a software layer that connects software and hardware through interaction with a hardware device.

③ The service customization information repository 403 may store service customization information required by a corresponding service at a point in time at which the energy management service runs. The service customization information may include a virtual IP, a port number, a specific path, and a path access right.

④ The measurement data repository 404 may store a set of measured data transmitted, that is, pushed by an energy data communication server to the cloud infrastructure service server 101. The measurement data repository 404 may correspond to a database system or a file system.

⑤ The common information sharing repository 410 may store environmental customization information commonly required for service and data collection, such as, for example, a transmission protocol and a data format required to transmit data in a communication module of the energy data communication server and services executed in the cloud infrastructure service server 101, an energy management service UI, and an image file.

Figure 5A:
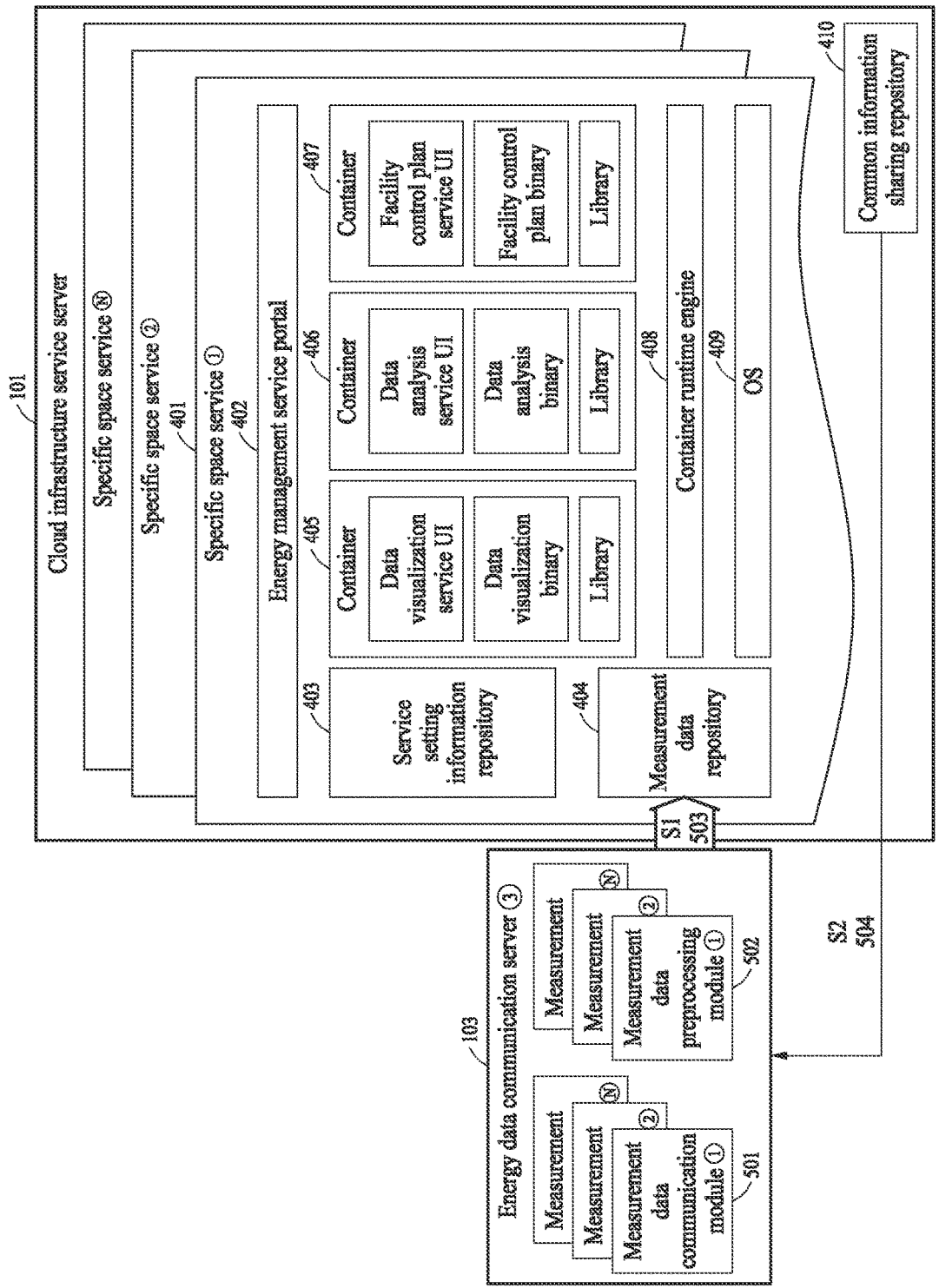
FIG. 5A illustrates an example of describing an operation of collecting measured data through an energy data communication server according to an example embodiment.

FIG. 5A illustrates an example of describing an operation of collecting measured data through an energy data communication server according to an example embodiment.

Referring to FIG. 5A, the energy data communication server 103 may transmit measured data measured in each specific space through interaction with the cloud infrastructure service server 101 to the cloud infrastructure service server 101. To this end, the energy data communication server 103 may include a measurement data communication module 501 and a measurement data preprocessing module 502. For each module, the same number of modules as a number of measurement devices that interact with the energy data communication server 103 may be formed.

The energy data communication server 103 may be a server that transmit measurement data collected from each measurement device to the cloud infrastructure service server 101 through a communication protocol, for example, Open Platform Communications United Architecture (OPC-UA) and MQ telemetry transport (MQTT). The energy data communication server 103 may sequence data and match a unit in a structure for transmitting measurement data.

① The measurement data communication module 501 may transmit measurement data to the measurement data repository 404 of the cloud infrastructure service server 101 through a communication protocol.

② The measurement data preprocessing module 502 may perform the functionality of adjusting a unit of measurement data, combining/separating data as requested by a module that receives order of the measurement data, and preprocessing data in a data format suitable for a transmission protocol.

Also, in operation S1 503, the energy data communication server 103 may transmit the measurement data from the measurement data repository 404 of the cloud infrastructure service server 101 and thereby induce the measurement data to be stored in the measurement data repository 404.

In operation S2 504, the energy data communication server 103 may perform the functionality of providing environment customization information required for data preprocessing and transmission, such as, for example, a transmission protocol and a data format, required for transmission of the measurement data from the common information sharing repository 410 of the cloud infrastructure service server 101 to the measurement data communication module 501.

Figure 5B:
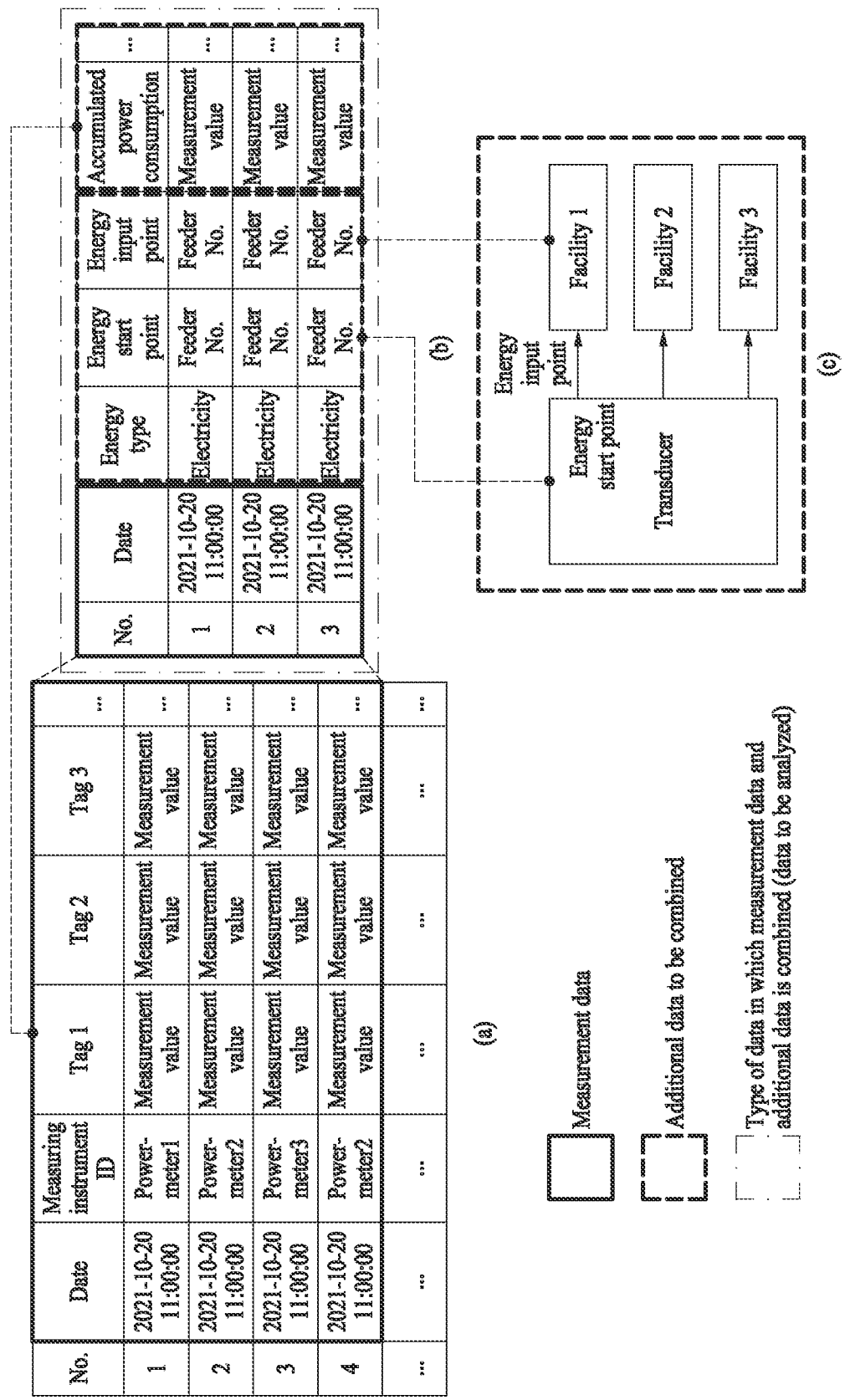
FIG. 5B illustrates an example of a data structure of measured data and a data format of preprocessed measured data according to an example embodiment.

FIG. 5B illustrates an example of a data structure of measurement data and a data format of preprocessed measurement data according to an example embodiment.

(a) of FIG. 5B is a graph showing a data structure of measurement data for energy consumption from measurement devices respectively installed in process facilities that constitute a specific space. A unit of measurement data according to the data structure may include a set of data for seconds. For example, a unit of measurement data may include a set of data for certain seconds, a unit of 1 second, a unit of 20 seconds, or a unit of 30 seconds based on a current time.

Accordingly, the example embodiment may determine a data structure for aggregating inter-second data corresponding to energy consumption. The example embodiment may collect measurement data including a set of inter-second data collected over time according to an ID of a measurement device. The measurement data may include a measurement value measured for each tag included in each measurement device.

(b) of FIG. 5B is a graph showing a result of combining measurement data in order of the measurement data with an adjusted data unit. The example embodiment may perform a preprocessing process for measurement data by combining measurement data of the respective process facilities and additional data. That is, the example embodiment may perform the preprocessing process of combining accumulated values of power consumption and energy flow based on each measurement device based on measurement data. Also, combination data combined through the preprocessing process may be analyzed based on each separate unit for each energy start point, for each energy input point, and for each energy type.

Here, the accumulated value of power consumption may refer to a value obtained by combining measurement values for the respective tags included in the respective measurement devices. The energy flow may represent relationship between a converter and process facilities as illustrated in (c) of FIG. 5B. The energy start point may represent a point at which flow of energy starts and the energy input point may represent a point at which energy flows in, that is, inputs. For example, a data type of measurement data combined through the preprocessing process may include a unique number, a collection date, an energy type, an energy start point, an energy input point, and accumulated power consumption.

Figure 5C:
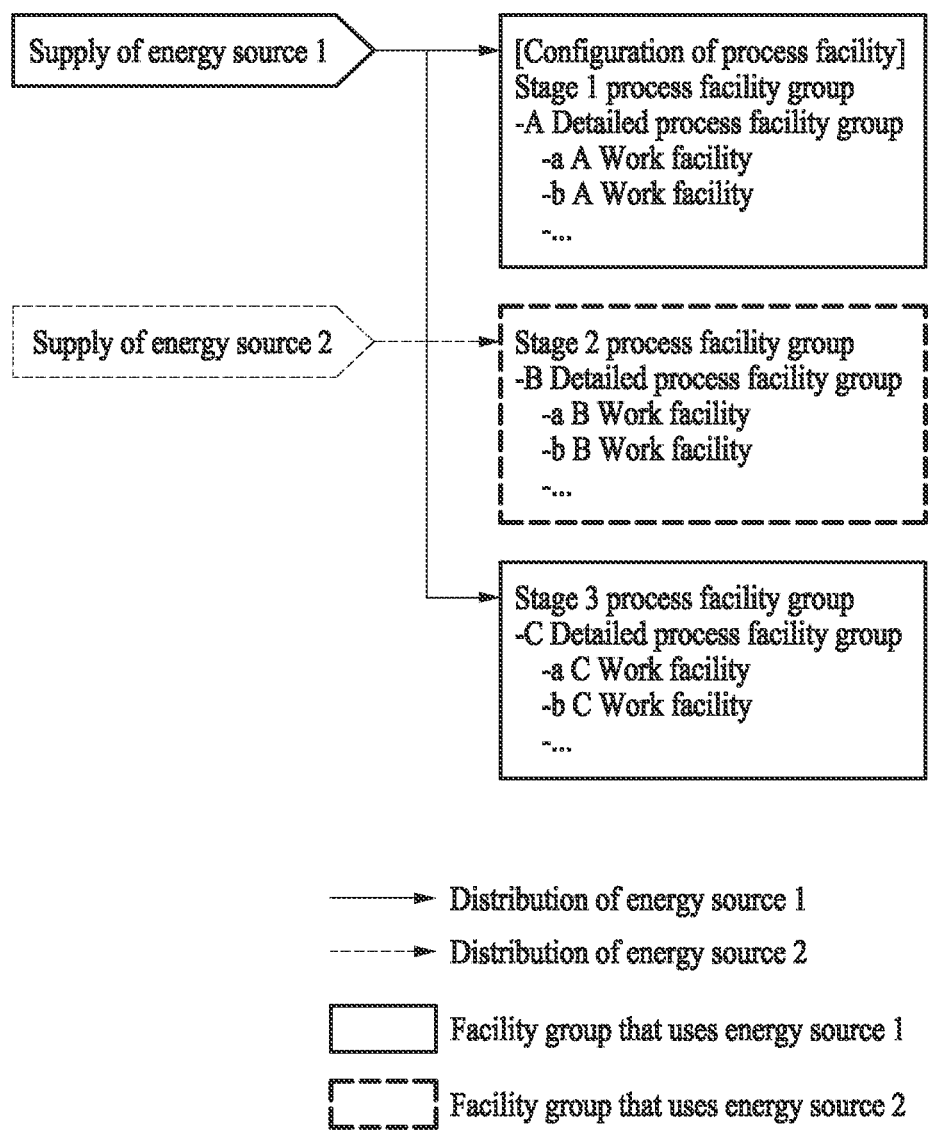
FIG. 5C illustrates an example of a top-down measurement structure of production process facilities that constitute a specific space according to an example embodiment.

FIG. 5C illustrates an example of a measurement structure of process facilities that constitute a specific space according to an example embodiment.

FIG. 5C illustrates a measurement structure of performing energy distribution according to an operating state of a process facility (or, simply referred to as a facility) that constitutes a specific space based on combination data combined through the preprocessing process of FIG. 5B. The example embodiment may perform the energy distribution using an inclusion relationship among an energy type that constitutes the combined combination data, an energy start point, and an energy input point. That is, the example embodiment may perform the energy distribution by calculating a sum of energy distributed from a corresponding energy start point to energy input points for each energy start point. This may be represented as a hierarchical structure of process facilities.

To this end, the example embodiment may apply an analysis algorithm to process facilities that are supplied with energy and may perform the energy distribution from the result. The analysis algorithm may analyze whether energy distribution according to an operating state of a process facility that constitutes the specific space is smoothly ongoing. For example, the example embodiment may perform the energy distribution by calculating a sum of energy distributed from an energy start point to energy inputs points as including 20% of loss. It may be expressed as the following Equation 1.

Energy amount supplied from energy source
(X)≥Σpower consumption of process facility
group+Σpower loss amount of process facility
group Σpower loss amount of process facility group=Σ(1−
power factor of process facility group)*rated
capacity of process facility group     [Equation 1]

Therefore, referring to Equation 1, the example embodiment may analyze whether the energy distribution is smoothly ongoing according to the hierarchical structure of process facilities in terms of data. It is further described with reference to FIG. 5D.

Figure 5D:
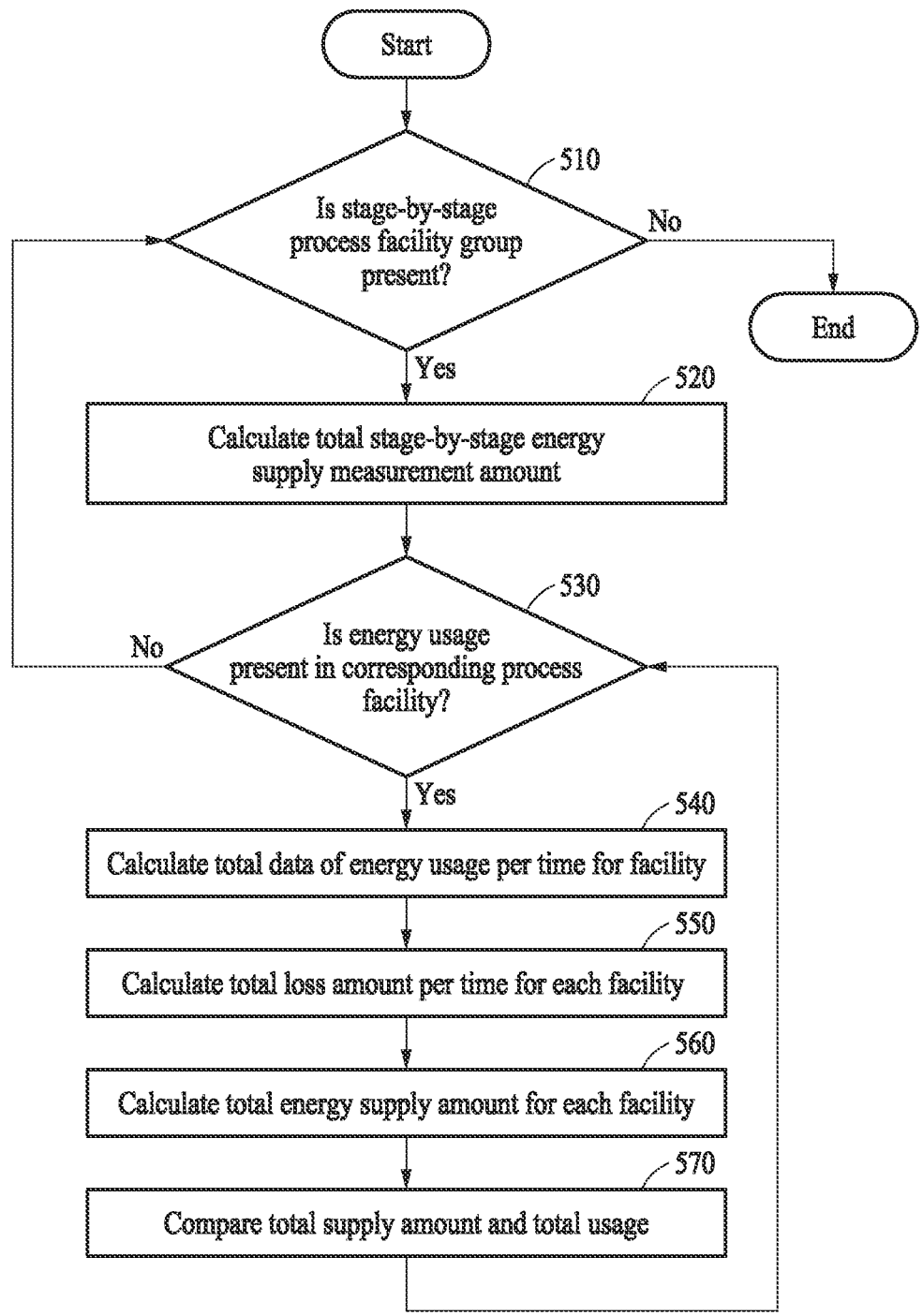
FIG. 5D is a flowchart illustrating an example of an analysis procedure for energy distribution according to an example embodiment.

FIG. 5D is a flowchart illustrating an example of an analysis procedure for energy distribution according to an example embodiment.

FIG. 5D is a flowchart illustrating a process of analyzing whether energy distribution is smoothly ongoing in terms of data, which may be represented as the following Equation 2.

Σstage-by-stage energy supply measurement
amount≥Σenergy use amount of process facility
group+Σenergy loss amount of process facility
group Σpower loss amount of process facility group=Σ(1−
power factor of process facility group)*rated
capacity of process facility group     [Equation 2]

Therefore, referring to Equation 2, the example embodiment may perform the analysis process by comparing (1) "total supply amount to process facilities that belong to a specific process facility group" and (2) a sum of "total energy use amount of process facilities" and "energy loss amount of process facilities". Also, the distribution analysis may determine that, according to a decrease in comparison between (1) total supply amount and (2) use amount+loss amount, loss is relatively small in distribution and efficient distribution is performed.

In detail, in operation 510, the example embodiment may verify whether a stage-by-stage process facility group is present based on a hierarchical structure of process facilities.

When the stage-by-stage process facility group is present (yes), the example embodiment may calculate a total stage-by-stage energy supply measurement amount in operation 520. Here, the stage-by-stage energy supply measurement amount may represent a total of energy measurement amounts distributed from a supply source (energy flow start point) for each hierarchical structure.

In operation 530, the example embodiment may verify whether energy use is present in a corresponding process facility. The energy use of the process facility may refer to a total of measurement values measured for each tag included in each measurement device.

When the energy use is present in the process facility (yes), the example embodiment may calculate total data of energy use per time for each process facility in operation 540.

In operation 550, the example embodiment may calculate a loss amount of energy use per time for each process facility and may calculate total data of the calculated loss amount.

In operation 560, the example embodiment may calculate a supply amount of energy use per time for each process facility and may calculate total data of the calculated supply amount.

In operation 570, the example embodiment may determine whether the energy distribution is efficiently performed by comparing the total data of the loss amount calculated in operation 550 and the total data of the supply amount calculated in operation 560.

Figure 6:
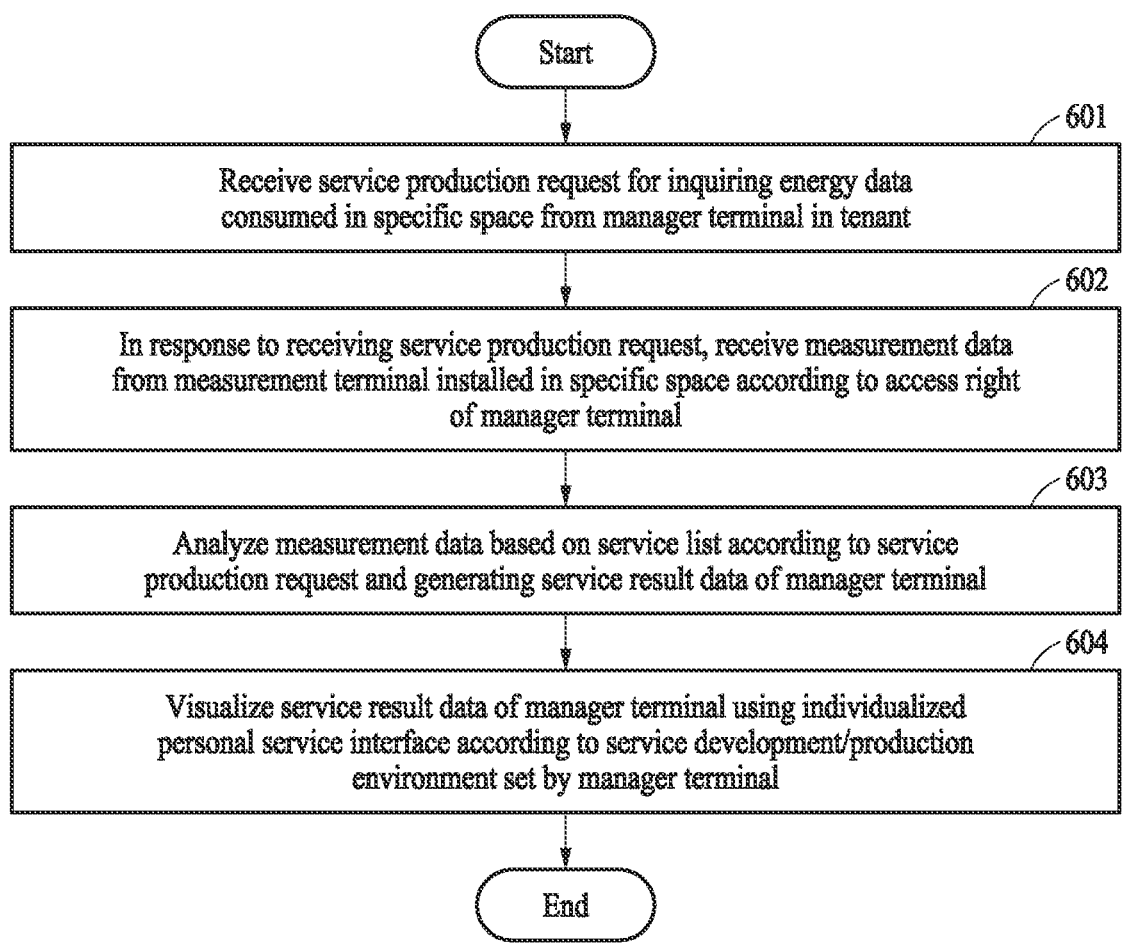
FIG. 6 is a flowchart illustrating an example of a service operation method according to an example embodiment.

FIG. 6 is a flowchart illustrating an example of a service operation method according to an example embodiment.

In operation 601, a cloud infrastructure service server may receive a service production request for inquiring energy data consumed in a specific space from a manager terminal of a tenant.

In operation 602, in response to receiving the service production request, the cloud infrastructure service server may receive measurement data from a measurement device installed in the specific space according to an access right of the manager terminal. The cloud infrastructure service server may determine the access right of the manager terminal at a point in time at which the service production request is received, using a unique identifier assigned for each tenant. The cloud infrastructure service server may receive the measurement data for energy consumption from the measurement device installed in the specific space desired to be managed through the manager terminal according to the access right.

In operation 603, the cloud infrastructure service server may analyze the measurement data based on a service composition list according to the service production request and may generate service result data to the manager terminal. The cloud infrastructure service server may adjust a unit of the measurement data to correspond to a data structure according to a transmission protocol. The cloud infrastructure service server may generate the service result data by performing a preprocessing process of combining or separating the measurement data according to order of the measurement data with the adjusted unit.

The cloud infrastructure service server may identify a functional operation of an energy management service that runs in the tenant based on the service composition list according to the service production request. The cloud infrastructure service server may analyze the measurement data through an execution function used for the functional operation of the energy management service and may generate the service result data for energy consumption in the specific space.

The cloud infrastructure service server may apply an execution function to the measurement data and may analyze whether energy distribution is smoothly ongoing according to an operating state of a facility that constitutes the specific space. The cloud infrastructure service server may generate the service result data in which the energy consumption is subdivided according to the analysis result. Here, the cloud infrastructure service server may generate a service using at least one of a virtual Internet protocol (IP), a port number, a specific path, and a path access right at a point in time at which a functional operation of the energy management service runs.

In operation 604, the cloud infrastructure service server may visualize the service result data on the manager terminal using an individualized personal service interface according to a service development/production environment set by the manager terminal. The cloud infrastructure service server may select a service image to be used by the manager terminal in the service development/production environment and may form a customized personal service interface to correspond to the service production request. The cloud infrastructure service server may visualize the service result data to be accessible through the customized personal service interface.

Figure 7:
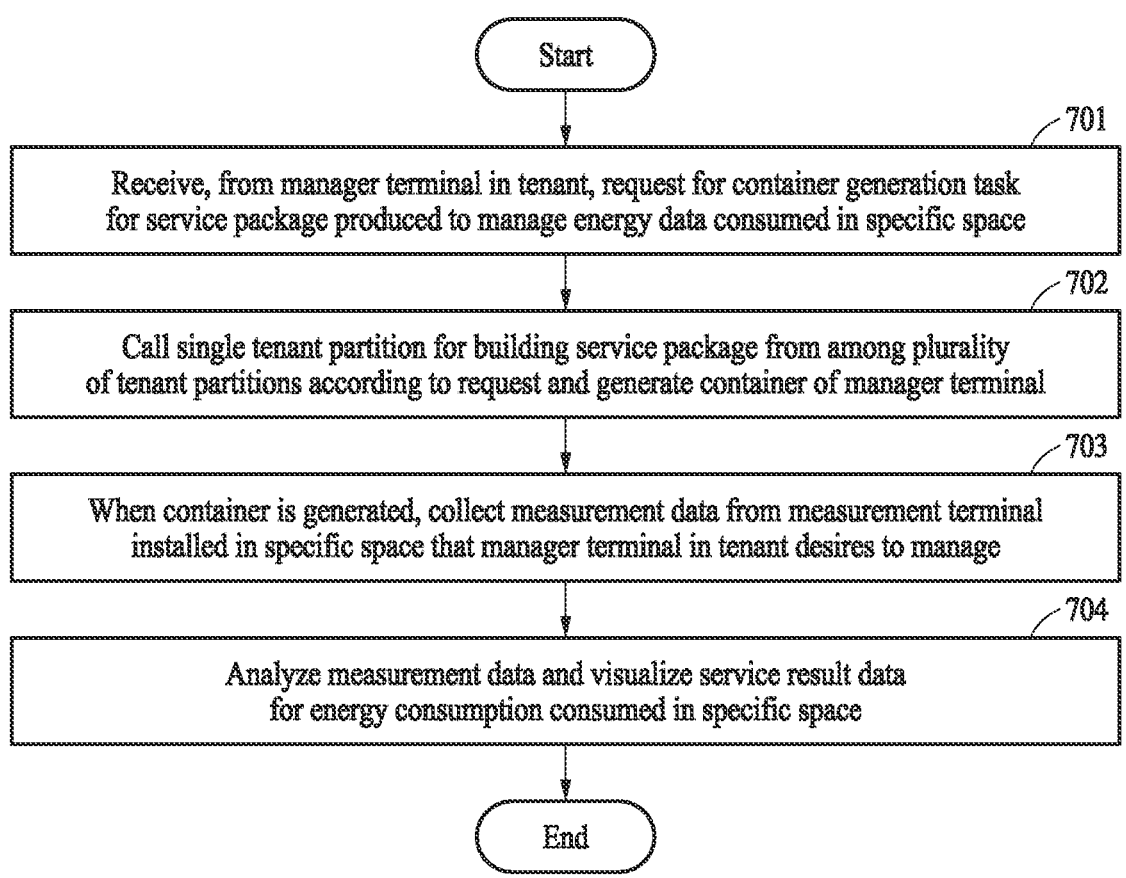
FIG. 7 is a flowchart illustrating an example of a service operation method according to another example embodiment.

FIG. 7 is a flowchart illustrating an example of a service operation method according to another example embodiment.

In operation 701, a cloud infrastructure service server may receive, from a manager terminal in a tenant, a request for container generation task for a service package produced to manage energy data consumed in a specific space. In detail, the cloud infrastructure service server may receive a service production request for inquiring an energy use status of the specific space to be managed through the manager terminal. In response to receiving the service production request, the cloud infrastructure service server may determine an access right of the manager terminal in the tenant using a unique identifier assigned for each tenant. When the access right is verified, the cloud infrastructure service server may receive the request for the container generation task for the service package from the manager terminal.

In operation 702, the cloud infrastructure service server may call a single tenant partition for building the service package from among a plurality of tenant partitions according to the request and may generate a container of the manager terminal. The cloud infrastructure service server may call a single tenant partition using an identifier of the manager terminal and an index of the tenant partition included in the cloud infrastructure service server. The cloud infrastructure service server may generate the container for building an individualized service package according to a use environment set by the manager terminal in the called single tenant partition.

In operation 703, when the container is generated, the cloud infrastructure service server may collect measurement data from a measurement device installed in the specific space that the manager terminal in the tenant desires to manage.

In operation 704, the cloud infrastructure service server may analyze the measurement data and may visualize service result data for energy consumption consumed in the specific space. In detail, the cloud infrastructure service server may adjust a unit of the measurement data collected from the measurement device and order of the measurement data to correspond to a data structure according to a transmission protocol. The cloud infrastructure service server may generate the service result data for the energy consumption in the specific space by performing a preprocessing process of combining or separating the measurement data with the adjusted data structure. The cloud infrastructure service server may visualize the service result data to the manager terminal using an individualized personal service interface according to a service development/production environment set by the manager terminal.

Also, the cloud infrastructure service server may identify a functional operation of an energy management service that runs in the tenant based on the service composition list according to the service production request. The cloud infrastructure service server may analyze the measurement data through an execution function used for the functional operation of the energy management service and may visualize the service result data. Therefore, the cloud infrastructure service server may apply an execution function to the measurement data and may visualize the subdivided service result data regarding whether energy distribution is smoothly ongoing according to an operating state of facility that constitutes the specific space measurement data.

FIG. 8 is a flowchart illustrating a service operation method according to still another example embodiment.

In operation 801, a cloud infrastructure service server may receive, from a manager terminal in a tenant, a service composition list for inquiring an energy use status in a specific space.

In operation 802, the cloud infrastructure service server may receive, from the manager terminal, a service package required for an energy management service according to the service composition list.

In operation 803, the cloud infrastructure service server may call a single tenant partition from among a plurality of tenant partitions that constitute the cloud infrastructure service server and may generate a container corresponding to the service package.

In operation 804, when the container is generated, the cloud infrastructure service server may receive measurement data from a measurement device installed in the specific space according to an access right of the manager terminal.

In operation 805, the cloud infrastructure service server may analyze the measurement data and may generate service result data to the manager terminal for the energy consumption. The cloud infrastructure service server may adjust a unit of the measurement data collected from the measurement device and order of the measurement data to correspond to a data structure according to a transmission protocol. The cloud infrastructure service server may generate the service result data for the energy consumption in the specific space by performing a preprocessing process of combining or separating the measurement data with the adjusted data structure.

Also, the cloud infrastructure service server may apply an execution function to the measurement data and may analyze whether energy distribution is smoothly ongoing according to an operating state of a facility that constitutes the specific space. The cloud infrastructure service server may generate the service result data in which the energy consumption is subdivided according to the analysis result.

In operation 806, the cloud infrastructure service server may visualize the service result data to the manager terminal using an individualized personal service interface according to a service development/production environment set by the manager terminal. The cloud infrastructure service server may form a personal service interface corresponding to the service production request using a service image to be used in the service development/production environment set by the manager terminal. The cloud infrastructure service server may visualize the service result data to be accessible through the personal service interface.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium), for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A service operation method performed by a cloud infrastructure service server device, the service operation method comprising:
receiving, by the cloud infrastructure service server device from a second server device, a service production request for inquiring energy data consumed in a specific space from a manager terminal in a tenant, the cloud infrastructure service server device comprising electronic circuitry;
in response to receiving the service production request, receiving, by the cloud infrastructure service server device from a third server device, measurement data from a measurement device installed in the specific space and storing the measurement data in a machine-readable storage device, the cloud infrastructure service server device receiving the measurement data according to an access right of the manager terminal;

analyzing, by the cloud infrastructure service server device, the measurement data based on a service composition list according to the service production request and generating service result data describing energy consumption consumed in the specific space; and forming, by the cloud infrastructure service server device, an individualized personal service interface according to a service development/production environment set by the manager terminal, including visualizing the service result data by generating a visualization of the service result data, and outputting to the manager terminal the individualized personal service interface containing the visualization of the service result data, wherein the visualizing of the service result data comprises applying an execution function to the measurement data for a functional operation of an energy management service that runs in the tenant, and visualizing subdivided service result data regarding whether energy distribution is smoothly ongoing according to an operating state of a facility that constitutes the specific space.

2. The service operation method of claim 1, wherein the receiving of the measurement data comprises:

determining the access right of the manager terminal at a point in time at which the service production request is received, using a unique identifier for each tenant; and receiving the measurement data for the energy consumption from the measurement device installed in the specific space desired to be managed through the manager terminal according to the access right.

3. The service operation method of claim 1, wherein the generating of the service result data to the manager terminal comprises:

adjusting a unit of the measurement data to correspond to a data structure according to a transmission protocol; and generating the service result data by performing a pre-processing process of combining or separating the measurement data according to order of the measurement data with the adjusted unit.

4. The service operation method of claim 1, wherein the generating of the service result data to the manager terminal comprises:

identifying the functional operation of the energy management service that runs in the tenant based on the service composition list according to the service production request; and analyzing the measurement data through the execution function used for the functional operation of the energy management service and generating the service result data for the energy consumption in the specific space.

5. The service operation method of claim 1, wherein the generating of the service result data to the manager terminal comprises:

applying an analysis function to the measurement data and analyzing whether the energy distribution is smoothly ongoing according to the operating state of the facility that constitutes the specific space; and generating the service result data in the form of a chart, in which the energy consumption is subdivided according to the analysis result.

6. The service operation method of claim 1, wherein the generating of the service result data to the manager terminal comprises generating a service using at least one of a virtual Internet protocol (IP), a port number, a specific path, and a path access right at a point in time at which the functional operation of the energy management service runs.

7. The service operation method of claim 1, wherein the visualizing of the service result data to the manager terminal comprises:

selecting a service image to be used by the manager terminal in the service development/production environment and forming a customized personal service interface to correspond to the service production request; and visualizing the service result data to be accessible through the customized personal service interface.

8. The service operation method of claim 1, wherein the visualizing of the service result data to the manager terminal comprises visualizing the service result data in an independent form according to a tenant based on reference information of a facility that constitutes the specific space.

9. A service operation method performed by a cloud infrastructure service server device, the service operation method comprising:

receiving, by the cloud infrastructure service server device from a second server device, a request from a manager terminal in a tenant for a container generation task for a service package produced to manage energy data consumed in a specific space, the cloud infrastructure service server device comprising electronic circuitry;

calling, by the cloud infrastructure service server device, a single tenant partition for building the service package from among a plurality of tenant partitions according to the request and generating a container of the manager terminal;

when the container is generated, collecting from a third server device and storing, by the cloud infrastructure service server device into a machine-readable storage device, measurement data from a measurement device installed in the specific space that the manager terminal in the tenant desires to manage according to the request; and analyzing, by the cloud infrastructure service server device, the measurement data; and forming, by the cloud infrastructure service server device, an individualized personal service interface according to the service package requested by the manager terminal, including visualizing the service result data by generating for the individualized personalized service interface a visualization of service result data describing energy consumption consumed in the specific space, wherein the visualizing of the service result data comprises applying an execution function to the measurement data for a functional operation of an energy management service that runs in the tenant, and visualizing subdivided service result data regarding whether energy distribution is smoothly ongoing according to an operating state of a facility that constitutes the specific space.

10. The service operation method of claim 9, wherein the receiving of the request for the container generation task comprises:

receiving a service production request for inquiring an energy use status of the specific space to be managed through the manager terminal;

in response to receiving the service production request, determining an access right of the manager terminal in the tenant using a unique identifier assigned for each tenant; and when the access right is verified, receiving the request for the container generation task for the service package from the manager terminal.

11. The service operation method of claim 9, wherein the generating of the container comprises:
    calling a single tenant partition using an identifier of the manager terminal and an index of the tenant partition included in the cloud infrastructure service server device; and
    generating the container for building the individualized service package according to a use environment set by the manager terminal in the called single tenant partition.

12. The service operation method of claim 9, wherein the visualizing of the service result data comprises:
    adjusting a unit of the measurement data collected from the measurement device and order of the measurement data to correspond to a data structure according to a transmission protocol;
    generating the service result data for the energy consumption in the specific space by performing a preprocessing process of combining or separating the measurement data with the adjusted data structure; and
    visualizing the service result data to the manager terminal using the individualized personal service interface according to a service development/production environment set by the manager terminal.

13. The service operation method of claim 9, wherein the visualizing of the service result data comprises:
    identifying the functional operation of the energy management service that runs in the tenant based on a service composition list according to a service production request; and
    analyzing the measurement data through the execution function used for the functional operation of the energy management service and visualizing the service result data.

14. The service operation method of claim 9, wherein the visualizing of the service result data comprises:
    forming a personal service interface corresponding to a service production request using a service image to be used in the service development/production environment set by the manager terminal; and
    visualizing the service result data to be accessible through the personal service interface.

15. The service operation method of claim 9, wherein the visualizing comprises visualizing the service result data in an independent form according to a tenant based on reference information of a facility that constitutes the specific space.

16. A service operation method performed by a cloud infrastructure service server device, the service operation method comprising:
    receiving, by the cloud infrastructure service server device from a second server device, a service composition list from a manager terminal in a tenant, the service composition list for inquiring an energy use status in a specific space, the cloud infrastructure service server device comprising electronic circuitry;
    receiving, by the cloud infrastructure service server device from the manager terminal, a service package required for an energy management service according to the service composition list;
    calling, by the cloud infrastructure service server device, a single tenant partition from among a plurality of tenant partitions that constitute the cloud infrastructure service server device and generating a container corresponding to the service package;
    when the container is generated, receiving from a third network device and storing, by the cloud infrastructure service server device into a machine-readable storage device, measurement data from a measurement device installed in the specific space, the cloud infrastructure service server device receiving the measurement data according to an access right of the manager terminal;
    analyzing, by the cloud infrastructure service server device, the measurement data and generating service result data describing energy consumption consumed in the specific space; and
    forming, by the cloud infrastructure service server device, an individualized personal service interface according to a service development/production environment set by the manager terminal, including visualizing the service result data by generating a visualization of the service result data and outputting to the manager terminal the individualized personal service interface containing the visualization of the service result data, wherein
    the visualizing of the service result data comprises applying an execution function to the measurement data for a functional operation of the energy management set that runs in the tenant, and visualizing subdivided service result data regarding whether energy distribution is smoothly ongoing according to an operating state of a facility that constitutes the specific space.

17. The service operation method of claim 16, wherein the generating of the service result data to the manager terminal comprises:
    adjusting a unit of the measurement data collected from the measurement device and order of the measurement data to correspond to a data structure according to a transmission protocol; and
    generating the service result data for the energy consumption in the specific space by performing a preprocessing process of combining or separating the measurement data with the adjusted data structure.

18. The service operation method of claim 16, wherein the generating of the service result data to the manager terminal comprises:
    applying an analysis function to the measurement data and analyzing whether the energy distribution is smoothly ongoing according to the operating state of the facility that constitutes the specific space; and
    generating the service result data in the form of a chart, in which the energy consumption is subdivided according to the analysis result.

19. The service operation method of claim 16, wherein the visualizing of the service result data comprises:
    forming a personal service interface corresponding to a service production request using a service image to be used in the service development/production environment set by the manager terminal; and
    visualizing the service result data to be accessible through the personal service interface.

* * * * *